United States Patent
Impens

(10) Patent No.: US 11,407,254 B2
(45) Date of Patent: Aug. 9, 2022

(54) NON-PNEUMATIC TYRE WITH AN IMPROVED CAVITY APERTURE

(71) Applicant: ARTIC INVESTMENTS S.A., Luxembourg (LU)

(72) Inventor: Dirk Impens, Ghent (BE)

(73) Assignee: COMPAGNIE GENERALE DES ETABLISSEMENTS MICHELIN, Clermont-Ferrand (FR)

(*) Notice: Subject to any disclaimer, the term of this patent is extended or adjusted under 35 U.S.C. 154(b) by 638 days.

(21) Appl. No.: 16/060,397

(22) PCT Filed: Dec. 11, 2015

(86) PCT No.: PCT/EP2015/079406
§ 371 (c)(1),
(2) Date: Jun. 7, 2018

(87) PCT Pub. No.: WO2017/097375
PCT Pub. Date: Jun. 15, 2017

(65) Prior Publication Data
US 2018/0370283 A1   Dec. 27, 2018

(51) Int. Cl.
*B60C 7/10* (2006.01)
*B60C 7/12* (2006.01)

(52) U.S. Cl.
CPC ............... *B60C 7/107* (2021.08); *B60C 7/12* (2013.01)

(58) Field of Classification Search
CPC ...... B60C 7/10; B60C 2007/107; B60C 7/107
See application file for complete search history.

(56) References Cited

U.S. PATENT DOCUMENTS

| 1,485,573 | A | * | 3/1924 | Swinehart | ................. | B60C 7/12 |
| | | | | | | 152/324 |
| 1,524,718 | A | * | 2/1925 | Leach | ...................... | B60C 7/12 |
| | | | | | | 152/326 |
| 1,616,843 | A | | 2/1927 | Brubaker | | |
| 3,486,545 | A | | 12/1969 | Niclas et al. | | |

(Continued)

FOREIGN PATENT DOCUMENTS

| CA | 2777281 A1 | 11/2013 |
| EP | 2397342 A1 | 12/2011 |

OTHER PUBLICATIONS

International Preliminary Report on Patentability and Written Opinion of the International Searching Authority dated Jun. 12, 2018, issued in corresponding International Application No. PCT/EP2015/079406, filed Dec. 11, 2015, 3 pages.

(Continued)

*Primary Examiner* — Kip T Kotter
(74) *Attorney, Agent, or Firm* — Christensen O'Connor Johnson Kindness PLLC

(57) ABSTRACT

A tire comprising a plurality of cavities formed on each of the first and second tire sidewalls. The cavities are extending longitudinally from a cavity opening up to a predetermined distance in the radial middle portion, wherein each cavity comprises a bottom surface and at least one cavity sidewall surface extending from the bottom surface to the cavity opening, said bottom surface and at least one sidewall surface defining an unpressurised cavity space. At least one of the tire cavities comprises at least one structural element extending outwardly from at least one of the cavity surfaces.

18 Claims, 16 Drawing Sheets

(56) References Cited

U.S. PATENT DOCUMENTS

| | | | | |
|---|---|---|---|---|
| 7,174,936 B2* | 2/2007 | Becker | ............... | B60C 7/10 |
| | | | | 152/246 |
| 8,517,068 B2* | 8/2013 | Delfino | ............... | B60C 7/22 |
| | | | | 152/5 |
| 9,139,046 B2* | 9/2015 | Norbits | ............... | B60C 7/12 |
| 9,352,617 B2* | 5/2016 | Zhang | ............... | B60C 7/10 |
| 2002/0092589 A1* | 7/2002 | Katoh | ............... | B29D 30/02 |
| | | | | 152/157 |
| 2009/0211674 A1* | 8/2009 | Hanada | ............... | B60C 7/12 |
| | | | | 152/53 |
| 2013/0319591 A1* | 12/2013 | Van De Wiele | ....... | B60C 7/102 |
| | | | | 152/246 |
| 2014/0062168 A1* | 3/2014 | Martin | ............... | B60C 7/10 |
| | | | | 301/62 |
| 2015/0034225 A1* | 2/2015 | Martin | ............... | B29D 30/02 |
| | | | | 152/326 |

OTHER PUBLICATIONS

International Search Report dated Aug. 10, 2016 in corresponding International Application No. PCT/EP2015/079406, filed Dec. 11, 2015, 3 pages.

Written Opinion of the International Searching Authority dated Aug. 10, 2016 in corresponding International Application No. PCT/EP2015/079406, filed Dec. 11, 2015, 5 pages.

\* cited by examiner

NON-PNEUMATIC TYRE WITH AN IMPROVED CAVITY APERTURE

TECHNICAL FIELD

The present invention relates to a tyre and more specifically to a non-pneumatic tyre provided with a plurality of cavities, each comprising at least one structural structure.

BACKGROUND ART

Non-pneumatic tyres are well known in the art for their use in vehicles operating in heavy duty off-road working conditions, where the tyres regularly come in contact with sharp objects, such as stones or scrap metal. In general, non-pneumatic tyres, such as solid tyres or unpressurised tyres, are preferred to the pneumatic tyres in heavy off-road working condition due to their reliability. A disadvantage of non-pneumatic tyres is that they do not provide sufficient level of cushioning. For example, some non-pneumatic tyres may provide little, if any, cushioning, potentially resulting in discomfort to passengers and/or damage to cargo. In addition, some non-pneumatic tyres may not be able to maintain a desired level of cushioning when the load changes on the tyre. To address the above-mentioned issues, non-pneumatic tyres may be provided with a plurality of non-pressurised cavity having predetermined dimensions that offer a degree of cushioning, thereby improving ride comfort. An example of non-pneumatic tyres with cavities is disclosed in EP2397342. The non-pneumatic tyre of EP2397342 is provided with a plurality of cavities on each of the tyre sidewalls, each cavity extending up to an intermediate tyre portion, which forms the cavity bottom wall surface. By providing cavities on each of the tyre sidewalls, it allows the tyre to flex in a predictable manner thereby improving a degree of cushioning in off-road riding conditions. However, non-pneumatic tyres provided with cavities have certain drawbacks. For example, during use of the tyre in off-road conditions, debris, such as stones or mud, may be lodged in the tyre cavities, which may compromise the tyre performance or cause unrepairable damage to the tyre thereby compromising the tyre reliability. In order to maintain the performance and prevent tyre damage, the tyres may be cleaned at regular interval so as to remove the debris lodged in the cavities. In order to ensure that the debris is effectively removed from the cavities, the cleaning operation is carried out by a human operator, who directs from a close proximity to the tyres, using a cleaning device such as a hose, highly pressurised cleaning liquid in the tyre cavities. The cleaning liquid may be substantially comprising water, which may further be combined with another chemical agent such as a detergent. It has been found that as the pressurised cleaning liquid is directed in the unpressurised space of the cavity, it eventually hits the bottom surface wall of the cavity, thereby causing the cleaning liquid to exit the cavity at about the same high velocity with the one that it entered. As a result, the cleaning liquid exiting the cavity would be directed towards the operator at an undesirable high velocity, thereby making it uncomfortable for the operator to maintain the required close proximity to the tyre and thus reduce the effectiveness of the cleaning operation. Furthermore, the cleaning liquid exiting the cavity may be directed at a high velocity towards an unprotected body part of the operator, such as the eyes, mouth, etc. Because, the cleaning liquid may comprise chemical agents, such as detergent, it would be undesirable for the cleaning liquid to come in contact with the human operator body parts, since such a contact may compromise the health and safety of the human operator.

DISCLOSURE OF THE INVENTION

It is an aim of the present invention to provide a tyre and more specifically a non-pneumatic tyre having cavities configured for significantly reducing the amount of debris entering the cavity.

It is a further aim of the present invention to provide a tyre and more specifically a non-pneumatic tyre where the cavities are configured for reducing the velocity with which the cleaning liquid exits the cavity during the cleaning operation.

This aim is achieved according to the invention with the tyre showing the technical characteristics of the characterising part of the first claim.

More specifically, according to the present invention a tyre, such as a non-pneumatic tyre, is provided. The tyre is provided with an annular body made of elastomeric material having a radial middle portion extending between a first tyre sidewall and a second tyre sidewall. The tyre is further provided with a plurality of cavities formed on each of the first and second tyre sidewalls. The cavities are extending longitudinally from a cavity opening up to a predetermined distance in the radial middle portion. Each cavity comprises a bottom surface and at least one cavity sidewall surface extending from the bottom surface to the cavity opening. The bottom surface and at least one of the sidewall surfaces define an unpressurised cavity space. According to embodiments of the present invention, at least one of the cavities are provided with at least one structural element extending outwardly from at least one of the cavity surface.

It has been found that by providing at least one structural element in the cavity the volume of the unpressurised cavity space may be significantly reduced without compromising the tyre performance. In this way, the structural element may prevent debris, such as stones or scrap metal, from entering the cavity, thereby significantly improving the reliability of the tyre. Furthermore, the at least one structural element may be used for dispersing the jet stream of highly pressurised cleaning liquid directed in the cavity, thereby significantly reducing the velocity of the cleaning liquid entering and/or exiting the unpressurised space of the at least one cavity. As a result, the amount of cleaning liquid directed towards the operator is significantly reduced, thereby significantly reducing the risk of an accident occurring during the cleaning operation.

According to embodiments of the present invention, the at least one structural element is provided with a predetermined geometrical shape, which is configured, when coming in contact with a jet stream of high pressure cleaning liquid, for breaking the jet stream of the cleaning liquid so as to reduce the velocity of the cleaning liquid exiting the cavity opening. For example, the structural element may comprise a surface having a geometrical shape configured, when it comes in contact with the jet stream of the high pressure cleaning liquid, to disperse the cleaning liquid jet stream as it enters and/or exits the cavity unpressurised space, thereby reducing the velocity of the cleaning liquid exiting the cavity. As a result, the cleaning liquid is prevented from reaching the sensitive body parts of the human operator, such as the eyes or the mouth, thus significantly reducing the risk of an accident occurring during the cleaning operation. For example, the structural element may comprise a surface having a convex shape. The convex shape may be arranged for dispersing the cleaning liquid jet stream, thereby reducing the velocity of the cleaning liquid exiting the cavity.

According to embodiments of the present invention, the at least one structural element comprises an elongated body extending from a cavity surface up to a predetermined distance in the cavity unpressurised space. Preferably the structural element is dimensioned such that a gap is maintained at least between a surface of the structural element e.g. the apex, and an opposing cavity surface. In the case, where a plurality of structural elements are provided in the cavity, a gap may be provided between at least one surface of each element, an opposing cavity sidewall surface, and at least one surface of an adjacent and/or opposing structural element. According to embodiments of the present invention, the gap may be dimensioned such that it is maintained under working conditions e.g. when the tyre is used in a vehicle performing various tasks. The structural elements provided in the cavity may be dimensions according to the dimensions of the cavity and/or the dimensions of the tyre. For example, the length of the structural element elongated body may be between 5.0 mm and 50.0 cm, preferably in the range of 10.0 mm to 40.0 cm, and more preferably in the range of 20.0 mm and 30.0 cm. Similarly the gap formed between a surface of the structural element, such as the apex, and/or a surface of an adjacent structural element, and/or an opposing cavity surface may be dimensioned depending on the cavity dimensions so as to prevent sharp objects, such as stones, from entering into the cavity and getting stuck at the cavity bottom surface. For example, the gap may be dimensions so as to prevent stones having at least one dimension substantially equal or smaller than the diameter of the cavity's bottom surface from entering the cavity. Furthermore, the gap may be dimensioned according to the tyre dimensions and intended use of the tyre. The dimension of the gap may be between 1.0 mm and 10.0 cm, more preferably between 5.0 mm and 5.0 cm, even more preferably between 10.0 mm and 3.0 cm. It has been found that by providing a gap between a surface of the structural element and/or an opposing cavity surface, and/or a surface of an adjacent structural element has the advantage that the cushioning performance of the non-pneumatic tyre is not compromised by the presence of the structural element in the cavity. As a result, the structural element can be positioned in the unpressurised cavity space, thereby reducing the volume of the cavity space and further reducing the velocity with which the cleaning liquid enters and/or exits the cavity, without affecting the overall performance of the non-pneumatic tyre.

According to embodiments of the present invention, the gap formed between a surface of the structural element, such as the apex, and/or a surface of an adjacent structural element, and/or an opposing cavity surface may be progressively reduced towards the bottom surface of the cavity. It has been found that by providing a progressively reduced gap it is possible to prevent objects having different dimensions from entering the cavity.

According to embodiments of the present invention, the at least one structural element provided in the cavity unpressurised space may extent outwardly from at least one of the cavity surfaces at a predetermined angle with respect to the cavity surface from which they extend outwardly from. For example, the at least one structural element may be provided with an angle between 0° to 90° with respect to the cavity surface from which it extends outwardly from, e.g. the bottom surface and/or the cavity sidewall surfaces. It has been found that by providing the at least one structural element at an angle with respect to the to the cavity surface from which it extends outwardly from may enhance the dispersion of the jet stream of the cleaning liquid thereby reducing the velocity of the cleaning liquid exiting the tyre cavity.

According to embodiments of the present invention, the structural element may be arranged for extending outwardly from the bottom surface of the cavity up to a predetermined distance towards the cavity opening. The structural element may extend substantially perpendicular to the tyre sidewall, so as to maintain a gap between the structural element body and the cavity sidewall surfaces. As a result, the volume of the cavity's unpressurised space may be reduced without compromising the cushioning performance of the non-pneumatic tyre.

According to embodiments of the present invention, the cavity comprises a plurality of structural elements extending outwardly from the at least one cavity sidewall surface at a predetermined angle with respect to one another and/or with respect to the cavity surface from which the at least one structural element extends outwardly from. For example, at least some of the structural elements extending outwardly from the cavity sidewall surfaces may be arranged at a substantially similar angle with respect to the cavity surface from which they extend outwardly from. At least some of the structural elements may be angled at a direction towards the cavity opening or another cavity surface. In other embodiments, each of the structural elements extending outwardly from the cavity sidewalls are arranged at a different angle with respect to one another and to the cavity surface from which they extend outwardly from. The plurality of structural elements may be provided on each of the cavity sidewall surface in a staggered configuration, for example along a helical path extending inside the unpressurised space towards the bottom surface along the cavity sidewalls, preferable substantially equally distributed over the circumference of the unpressurised space. The plurality of structure elements may for example be provided in a plurality of rows arranged on top of one another. It has been found that by providing a plurality of structural elements the volume of the unpressurised space may be further reduced, thereby significantly reducing the amount of debris entering the cavity. Furthermore by providing a plurality of structural element with a predetermined angle may increase the dispersion of the cleaning liquid jet stream thereby further reducing the velocity of the cleaning liquid exiting the cavity. Moreover, by providing the structural elements such that they are angled towards the same direction, e.g. towards the cavity opening, may ensure the structural integrity of the structural elements during the demoulding process of the non-pneumatic tyre and prevent damage to the structural elements where the mould plate is removed.

According to embodiments of the present invention, the structural elements extending outwardly from the cavity sidewalls may be connected to the elongated body of the structural element protruding from the bottom surface. In this way, the structural element may prevent debris from entering the cavity while being able to effectively disperse a jet stream of highly pressurised cleaning liquid as it enters and/or exits the cavity.

According to embodiments of the present invention, the structural elements extending outwardly from the at least one cavity sidewall surface may have a continuous and substantially flat surface extending longitudinally along the at least one cavity sidewall surface. In this way, the volume of the cavity may be significantly reduced, thereby further limiting the amount of debris that can enter in the cavity, and thus improving the reliability of the tyre. According to the present invention, at least one of the structural elements may be provided with a hollow cross-section, thereby significantly reducing the velocity with which the cleaning liquid exits the cavity.

According to an embodiment of the present invention, the cavity has a cross-section that tapers towards the bottom surface. For example, the width of the cavity may be continuously reduced from the cavity opening to the bottom surface. The cavity sidewalls may be provided with at least one radial shoulder. In this way the volume of the cavity's unpressurised space may be reduced while allowing for the dispersion of the cleaning liquid jet stream without compromising the performance of the tyre.

According to embodiments of the present invention, the cavity may have a triangular shape. However, the cavity may have any other desirable shape such as a round shape, rectangular, square or another polygonal shape.

According to embodiments of the present invention, the structural elements may be made of a different material to that of the tyre annular body. In other embodiments, the structural elements may be made of an elastomeric material substantially identical to that of the tyre annular body.

According to embodiments of the present invention, a method for cleaning the tyre according to the present invention may be proved. The method may comprise the steps of:

a) providing a cleaning device arranged for being operated at least between an on and an off position, the cleaning device being arranged for directing, when in the on position, a jet stream of highly pressurised cleaning liquid towards a predetermined direction;

b) connecting said cleaning device to a source of high pressure cleaning liquid;

c) positioning, by means of a human operator, the cleaning device at close proximity to a cavity in a tyre sidewall;

d) operating the cleaning device in the on position such that the high pressure liquid is directed from the source of high pressure liquid to the cavity in the tyre sidewall;

e) maintaining the cleaning device in the on position for a predetermined amount of time so as to ensure the removal of debris from the cavity's unpressurised space;

f) repeat steps c) to e) for all cavities in the tyre sidewalls; and g) operating the cleaning device in the off position.

BRIEF DESCRIPTION OF THE DRAWINGS

The invention will be further elucidated by means of the following description and the appended figures.

MODES FOR CARRYING OUT THE INVENTION

Figure 1:
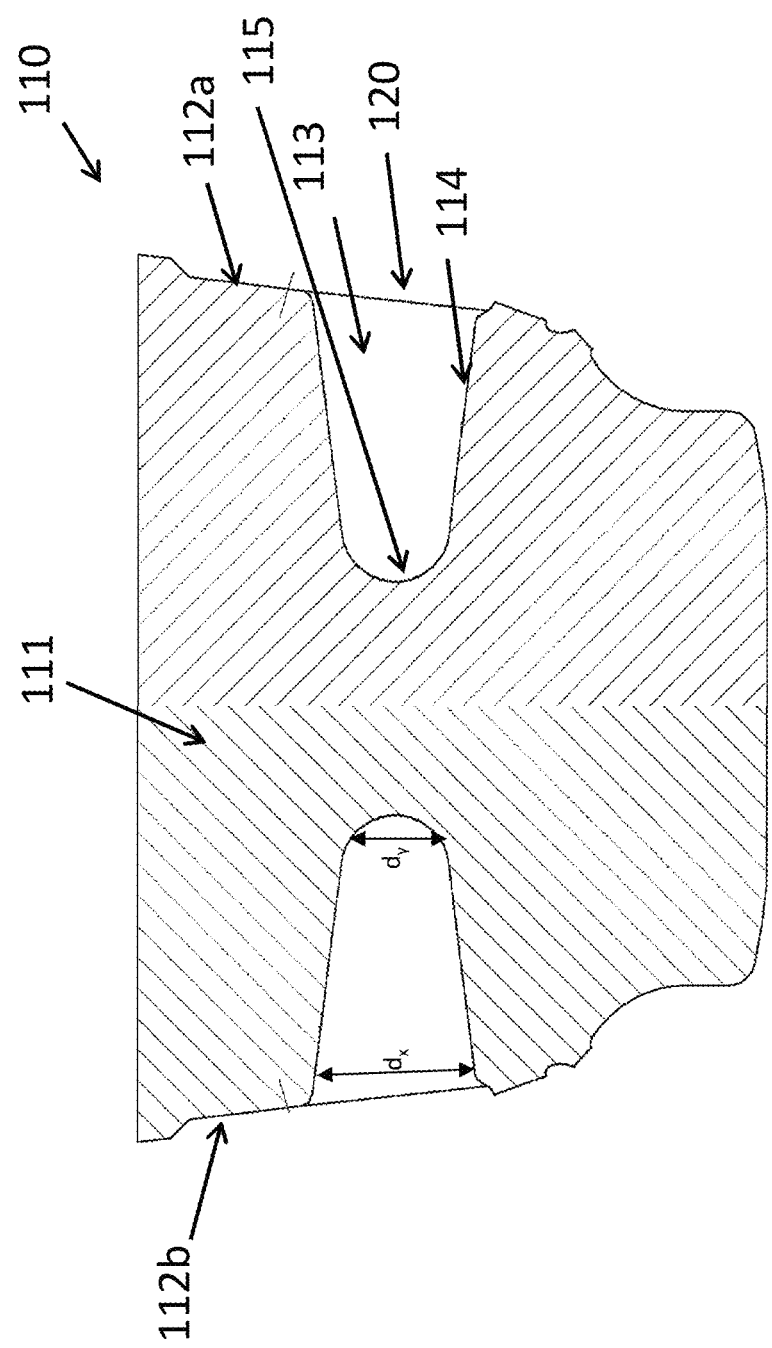
FIG. 1 shows a cross-section of a non-pneumatic tyre comprising a plurality of cavities according to the prior art.

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes. The dimensions and the relative dimensions do not necessarily correspond to actual reductions to practice of the invention.

Furthermore, the terms first, second, third and the like in the description and in the claims, are used for distinguishing between similar elements and not necessarily for describing a sequential or chronological order. The terms are interchangeable under appropriate circumstances and the embodiments of the invention can operate in other sequences than described or illustrated herein.

Moreover, the terms top, bottom, over, under and the like in the description and the claims are used for descriptive purposes and not necessarily for describing relative positions. The terms so used are interchangeable under appropriate circumstances and the embodiments of the invention described herein can operate in other orientations than described or illustrated herein.

The term "comprising", used in the claims, should not be interpreted as being restricted to the means listed thereafter; it does not exclude other elements or steps. It needs to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting only of components A and B. It means that with respect to the present invention, the only relevant components of the device are A and B.

The present invention will be elucidated by means of the example embodiments shown in FIGS. 1 to 10, which will be described in more details below.

The following exemplary embodiments will be described with the understanding that structure of one embodiment identified with reference number XZZ corresponds to structure of another embodiment identified by reference number YZZ unless otherwise noted, wherein X, Y, and Z are integers. For example, tyre 110 (shown in FIG. 1) corresponds to tyre 210 (shown in FIGS. 2a and 2b) unless otherwise noted.

FIG. 1 shows a non-pneumatic tyre 110 according to the state of the art. The tyre comprises an annular body having a radial middle region 111 extending between the tyre sidewalls 112. As previously described, in order provide the non-pneumatic tyre 110 with a level of cushioning, the tyre 110 may be provided with a plurality of cavities 113, which are formed on each of the tyre sidewalls 112a and 112b. The cavities 113 may extend longitudinally from a cavity opening 120 up to a predetermined distance in the radial middle region 111. Each cavity 113 may be provided with a bottom surface 115 and at least one cavity sidewall surface 114 extending from the bottom surface 115 to the cavity opening 120. The number of cavity sidewall surfaces 114 may depend on the shape of the cavity 113, e.g. a circular shaped cavity 113 may have one cavity sidewall surface 114, while a triangularly shaped cavity 113 may have three cavity sidewall surfaces 114. The cavity bottom surface 115 may be formed by the material of the radial middle region 111. The cavity bottom surface 115 and cavity sidewall surfaces 114 may be arranged for defining an unpressurised cavity space. The cavity unpressurised space is arranged for allowing the tyre to flex under working conditions, thereby providing a certain degree of cushioning performance while ensuring that the reliability of the non-pneumatic tyre, which is crucial in heavy duty off-road conditions, is not compromised. Depending on the degree of cushioning required the number, shape and dimensions of the cavities 113 may be adjusted accordingly. Furthermore, the position of the cavities 113 on each of the tyre sidewall 112 and 112b may be altered. For example, the cavities 113 on each tyre sidewall 112a and 112b may be aligned as shown in FIG. 1. However, in other embodiments the cavities 113 on each tyre sidewall 112 and 112b may not be necessary aligned. The tyre cavities 113 may be provided with a cross-section that tapers towards the bottom surface. For example, the width of the cavity 113 may be continuously reduced from the cavity opening to the bottom surface, thereby providing a cavity 113 having a cavity opening diameter dx that is larger than the bottom surface diameter dy, as shown in FIG. 1. The cavity 113 may be provided with any desirable shape e.g. the cavity 113 may have a triangular shape, a round shape, rectangular, square or another polygonal shape.

According embodiments of the present invention, the cavities 113 may be provided with at least one structural element 116, which may extend outwardly, also referred to as protruding, from at least one of the cavity surfaces e.g. the cavity sidewall surfaces 114 and/or the cavity bottom surface 115. By providing at least one structural element 116 extending up to a predetermined distance within the cavity unpressurised space, it may be possible to reduce the volume of the cavity unpressurised space. As a result, significantly reducing the amount of debris, such as stones or scrap metal, that may enter the cavity unpressurised space and potential damage the tyre 110. Furthermore, by providing at least one structural element 116 in the cavity unpressurised space has that the advantage of reducing the velocity of the jet stream of cleaning liquid directed to the cavity 113 during the cleaning operation. As a result, the contact of the cleaning liquid with human operator is significantly reduced, thereby significantly improving the effectiveness of the cleaning operation, since the human operator is able to maintain the required close proximity to the tyre 110, and reducing the likelihood of an accident.

Figure 2A:
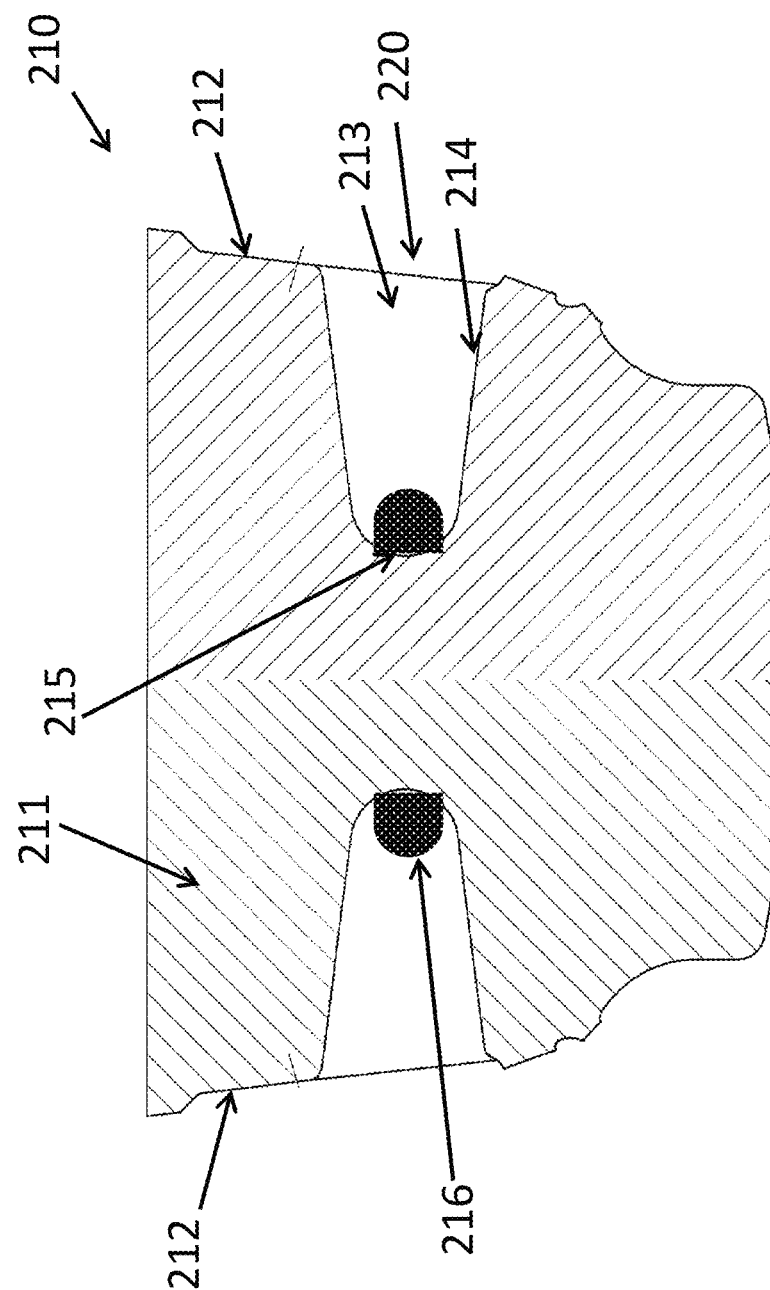
FIGS. 2 to 10 show different views of a non-pneumatic tyre comprising a plurality of cavities, wherein at least one of the cavities is provided with at least one structural element according to embodiment of the present invention.
Figure 2B:
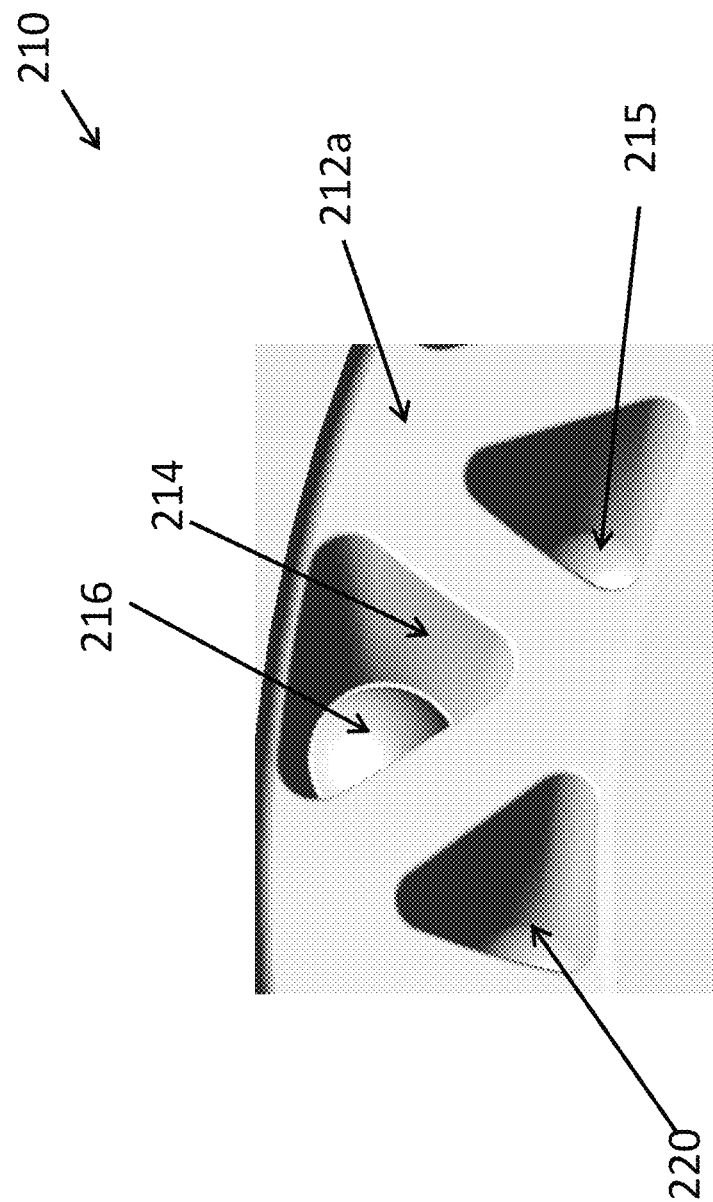

FIGS. 2a and 2b show different views of a tyre 210 according to embodiments of the present invention. The cavity 213 is provided with at least one structural element 216, which extends outwardly from the bottom surface 215 of the cavity 213. The at least one structural element 216 may be provided with a desirable geometrical shape, which is configured, when coming in contact with a jet stream of a cleaning liquid, for dispersing the jet stream so as to reduce the velocity of the cleaning liquid as it enters and/or exits the cavity 213. The at least one structural element may be provided with a surface having a convex shape. However, it should be noted that the at least one structural element 216 may be provided with any other shape having the desirable results, e.g. conical, triangular, square, polygonal, etc.

Figure 3A:
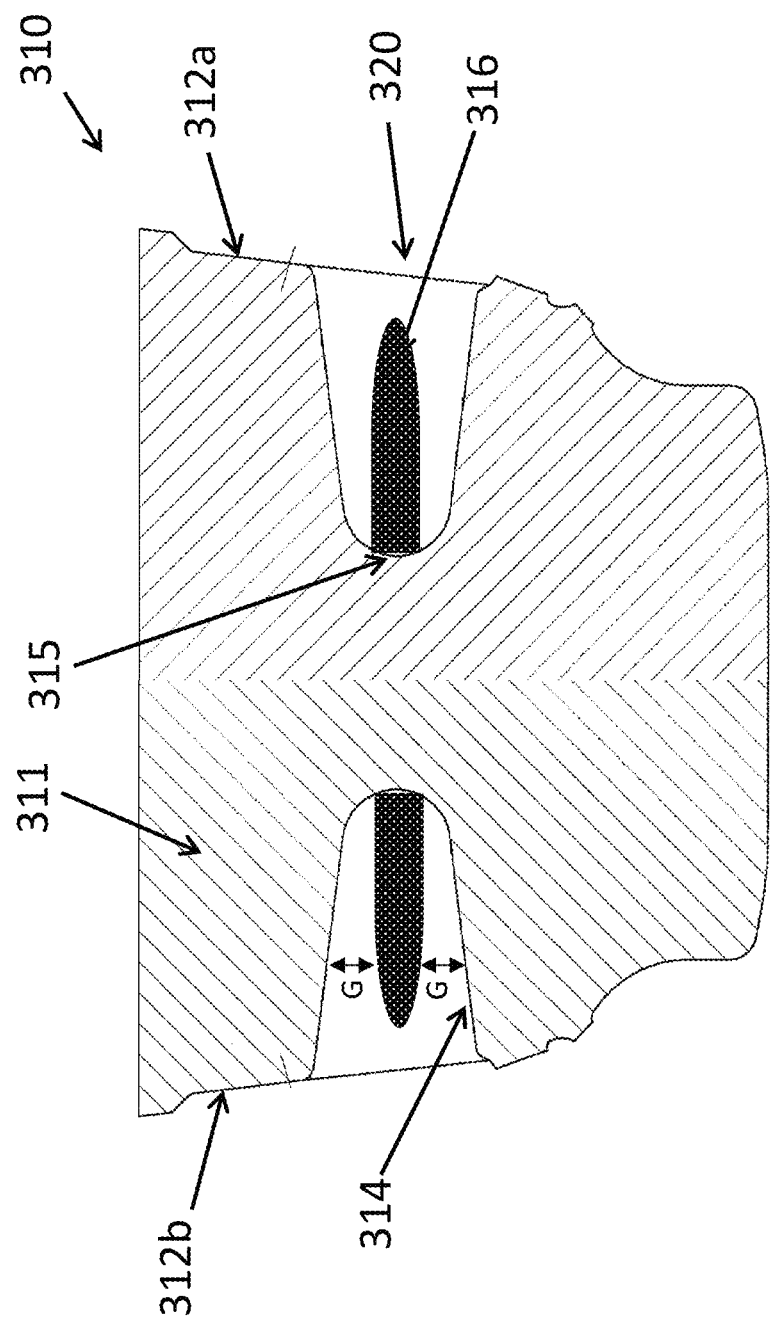
Figure 3B:
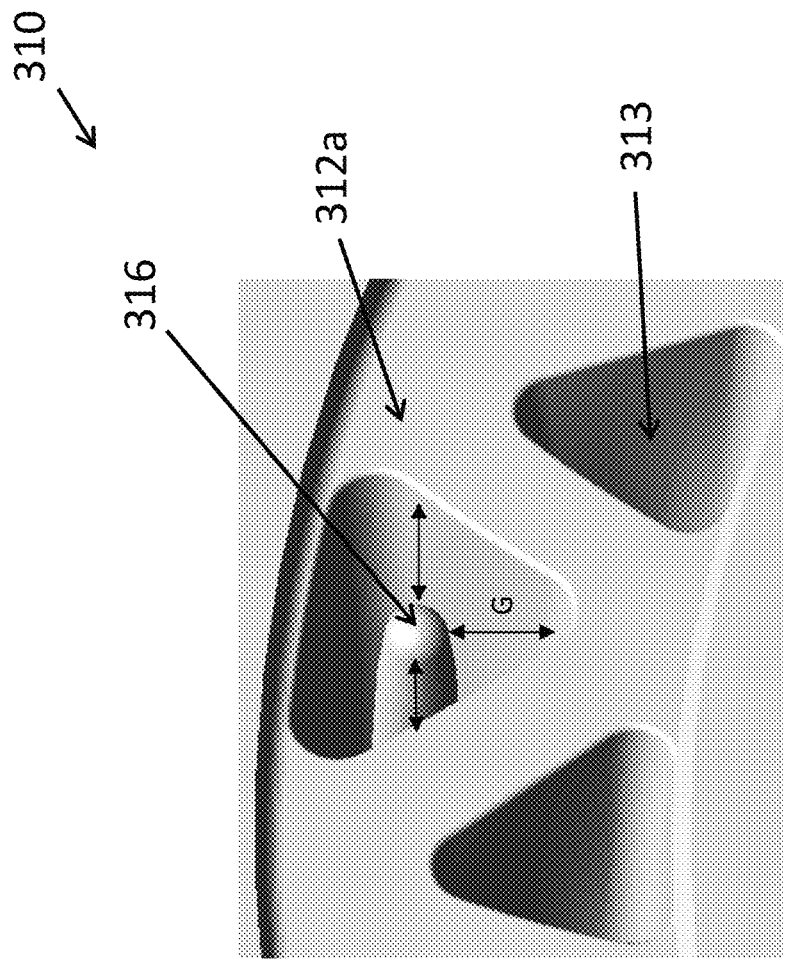

According to embodiments of the present invention, the at least one structural element 216 may comprise a longitudinal body, which may extend up to a predetermined distance in the unpressurised cavity. The at least one structural body may be dimensioned such that a gap G is maintained between a surface of the structural element 216 and/or at least one opposing cavity sidewall surfaces 214 and/or an adjacent structural element 216. The at least one structural element 216 may be dimensioned such that the gap G is maintained even under working conditions. For example, the gap G may be between 1.0 mm and 10.0 cm, more preferably between 5.0 mm and 5.0 cm, even more preferably between 10.0 mm and 3.0 cm. It has been found that by maintaining a gap between a surface of the at least one structural element 216, such as the apex and/or the body of the structural element 216, it may be possible to reduce the volume of the cavity unpressurised space, thereby preventing debris from entering the cavity and further dispersing a jet stream of highly pressurised cleaning liquid, while allowing the tyre 210 to flex under working conditions so as to maintain the cushioning performance of the tyre 210. FIGS. 3a and 3b show different views of a tyre according to embodiments of the present invention, wherein the at least one structural element 316, similarly to FIGS. 2a and 2b, extends outwardly from the bottom surface 315 of the cavity 313. As shown in FIGS. 2a to 3b a gap G is maintained between the surface of the at least one structural element 216, 316 and the at least one cavity sidewall 214, 314. For example, in FIG. 3a a gap is provided between the elongated body of the at least one structural element 316 and the cavity sidewalls 314. The gap G may be dimensioned such that it is progressively reduced towards the bottom surface of the cavity 315. In this way it may be possible to prevent objects of different dimensions for entering the cavity 313. The gap G may be dimensioned so as to prevent objects of a predetermined dimension from getting stuck at the cavity's bottom surface 315. For example, the gap G may be dimensioned so as to prevent stones having at least one dimension that substantially equal to the diameter of the bottom surface dy and another dimension that is smaller than the cavity opening diameter dx from getting stuck at the bottom surface 315. It has been found that by provided a progressively reduced gap G has the advantage of preventing objects of different dimensions of entering the cavity, thereby allowing for the use of the tyre 310 in a variety of working conditions.

According to embodiments of the present invention, the cavity may be provided with a plurality of structural elements 316, extending outwardly from the cavity sidewalls surfaces 314 and/or the bottom surfaces 315. At least some of structural elements 316 may be angled with respect to the cavity sidewall surfaces from which they protrude from. For example, at least some of the structural elements 316 may be angled towards the same direction. For example some the structural elements 316 provided in the cavity may be angled towards the bottom surface 315 and/or the cavity opening.

Figure 4A:
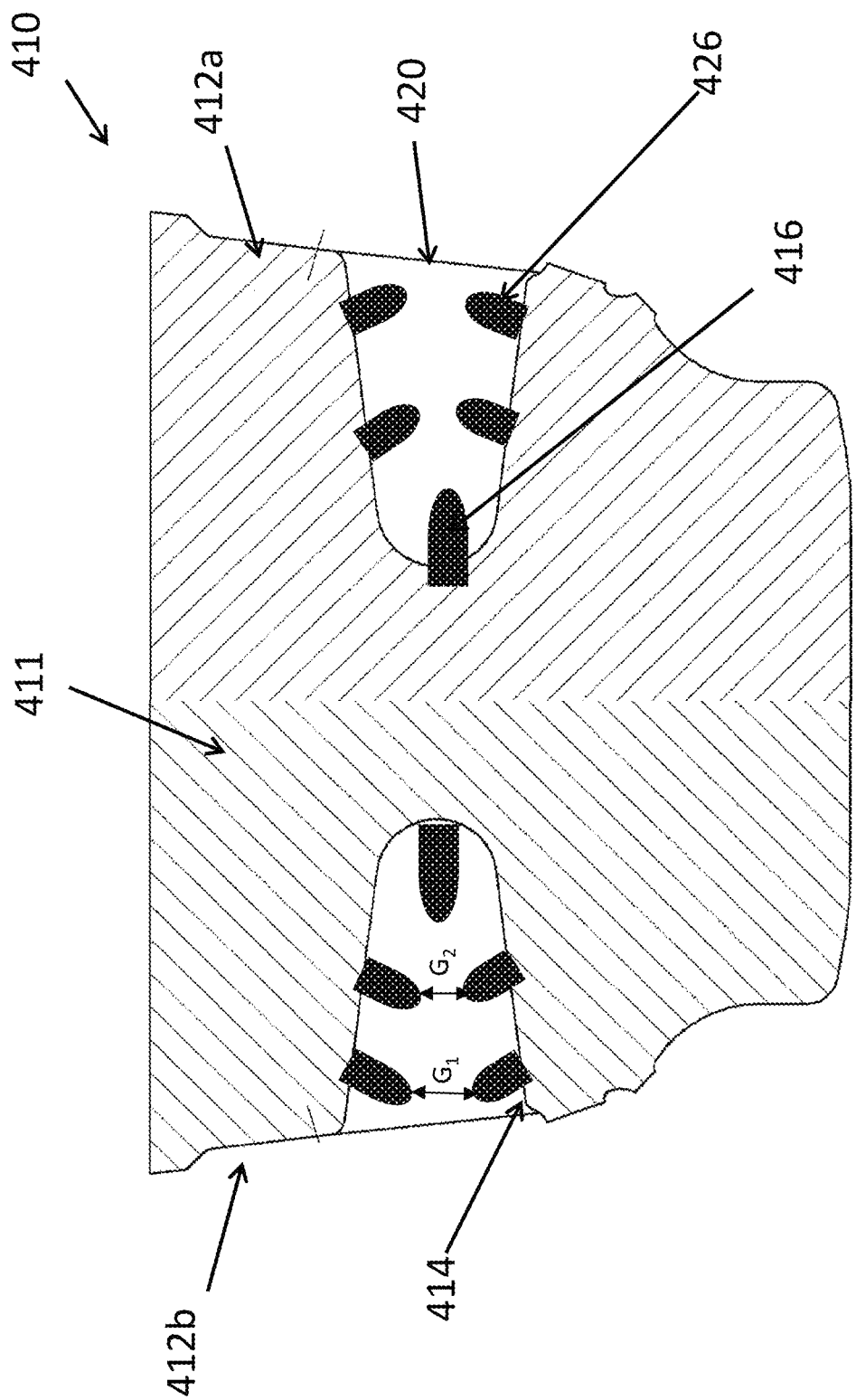
Figure 4B:
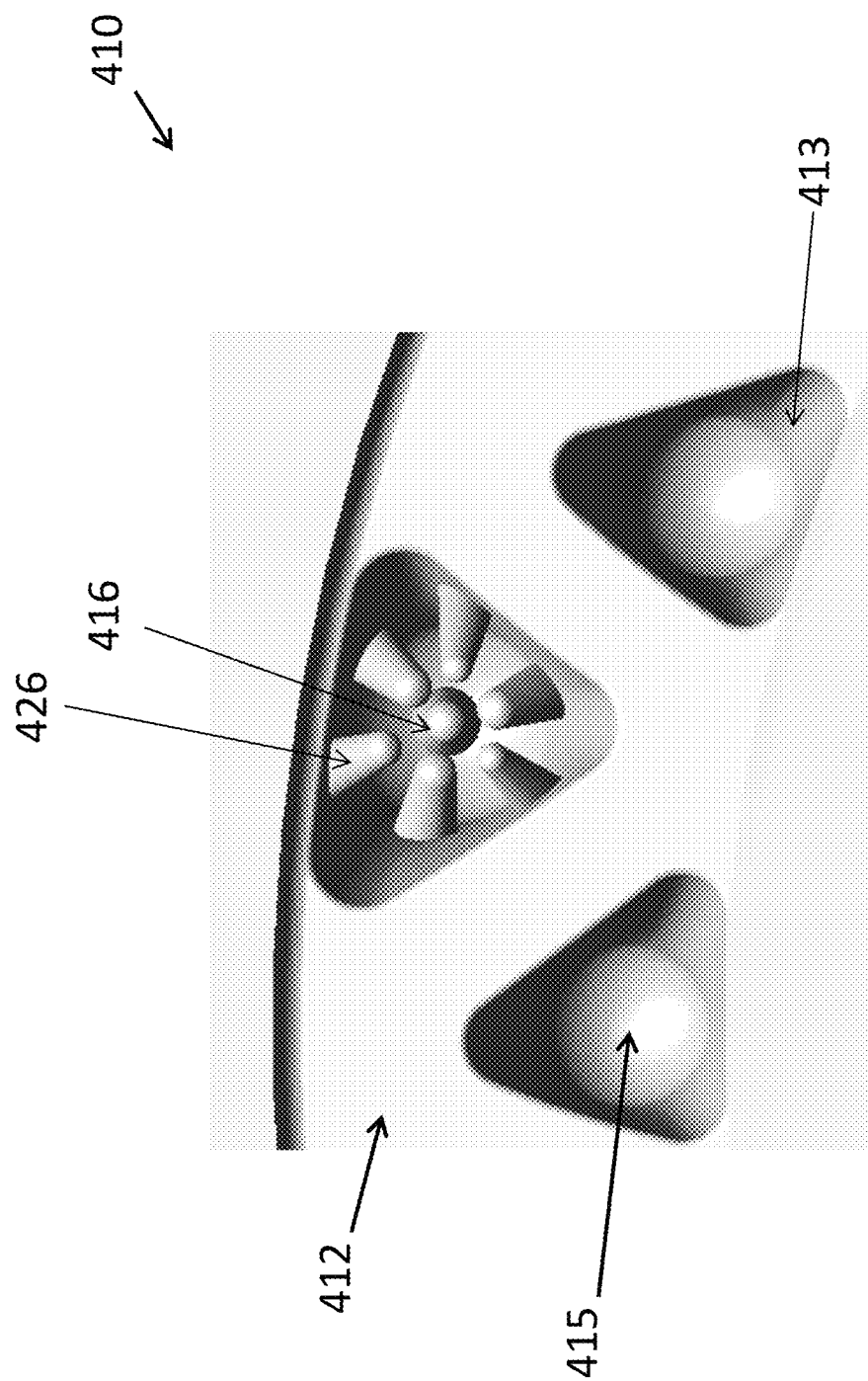

FIGS. 4a and 4b show a tyre 410 provided with a plurality of structural elements 416 in the cavity unpressurised space. The cavity 413 may be provided with a plurality of structural elements 426 extending outwardly from the cavity sidewall surfaces 415 and at least one structural element 416 extending outwardly from the bottom surface 415. The structural elements 426 may be angled towards the same direction, e.g. towards the cavity opening 420 or the bottom surface 415. The angle at which the structural elements 416 and 426 extend from their respective cavity surface may be between 0° to 90°. The structural elements 416 and 426 may be dimensioned such that a gap G is maintained between adjacent and/or opposing structural elements 416 and 426. The structural elements 416 and 426 may have similar dimensions and shape. In other embodiments at least one of the structural elements 416 and 426 may have different dimensions and/or shape from the remaining structural elements 416 and 426 in the cavity. In order to provide a progressively reducing gap G in the cavity, the cavity may be provided with a plurality of structural elements 416 and 426 arranged in rows, wherein the gap G is reduced at each structural element row by a predetermined amount. For example, as shown in FIG. 4a, the cavity 413 may be provided with at least two rows of structural elements 426 each respectively providing a gap G1 and G2. Each gap may be dimensioned to prevent objects of a predetermined size from getting stuck at the bottom surface 415, thereby causing damage to the tyre. For example, gap G1 may be dimensioned so as to prevent objects of a first dimension from reaching the bottom surface 415, while gap G2 may be dimensioned so as to provide a gap that is suitable for preventing objects of a second dimension, which is smaller than the gap G1, from reaching the bottom surface 415.

Figure 5A:
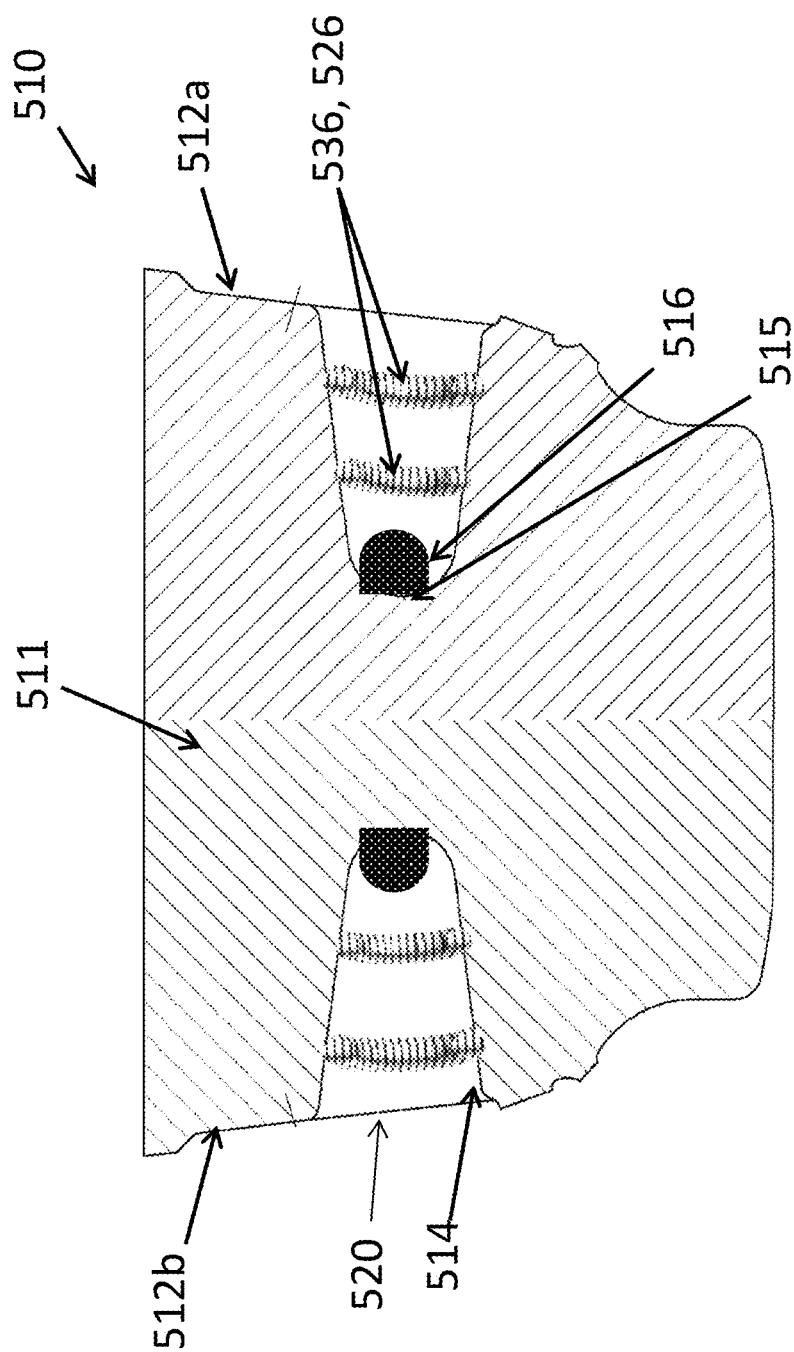
Figure 5B:
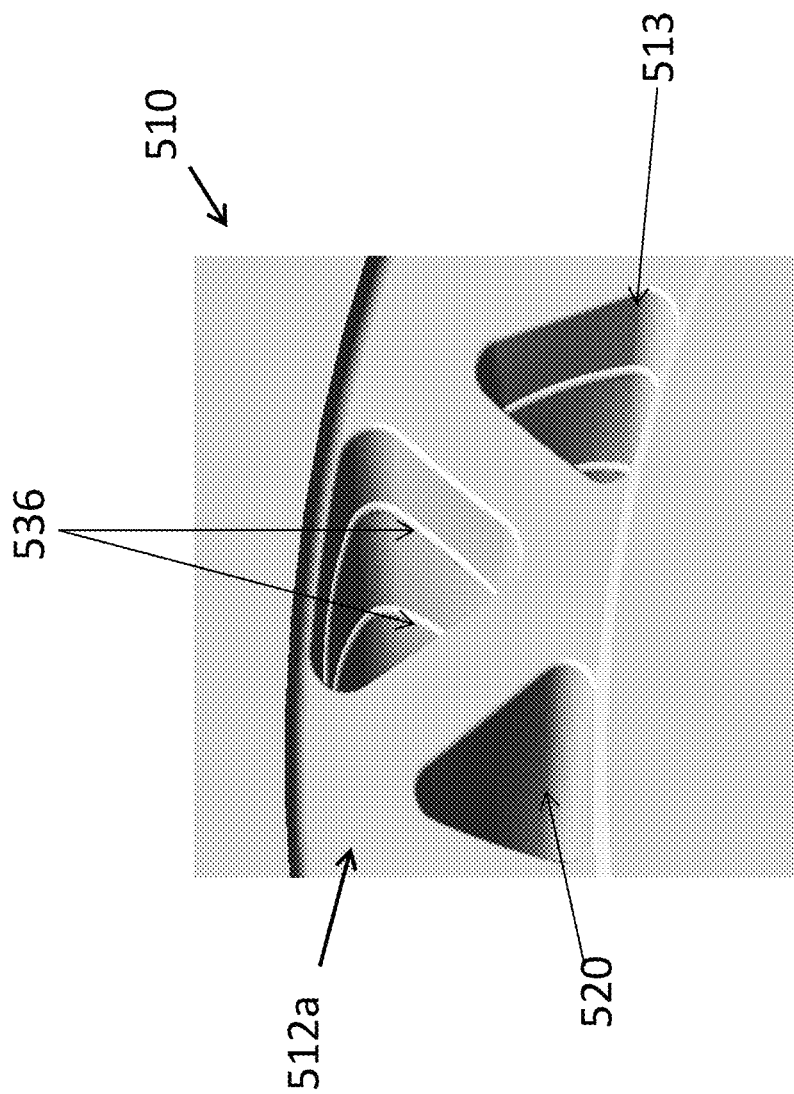

FIGS. 5a and 5b show a tyre 510 having at least one cavity provided with a structural element 516 and further structural elements 526 in the form of radial shoulders 536 extending outwardly from the cavity sidewalls 515, which are arranged for reducing further the volume of the cavity unpressurised space and disperse a jet stream of highly pressurised cleaning liquid.

Figure 6A:
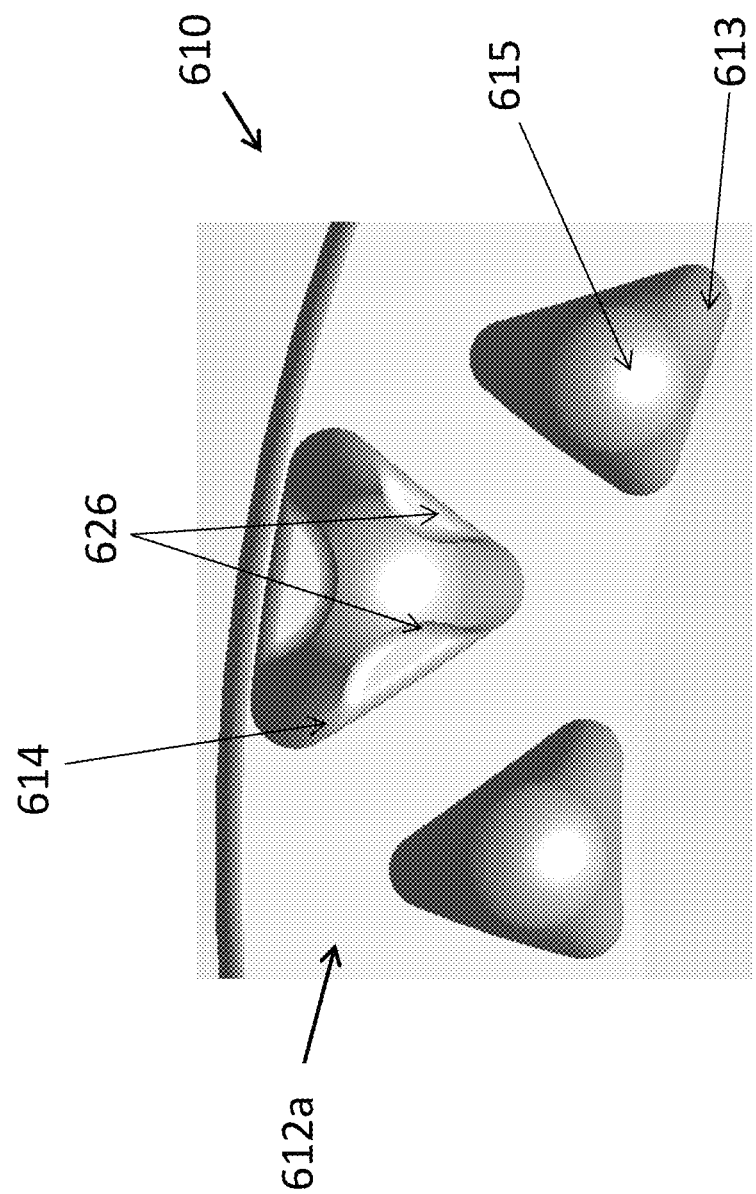
Figure 6B:
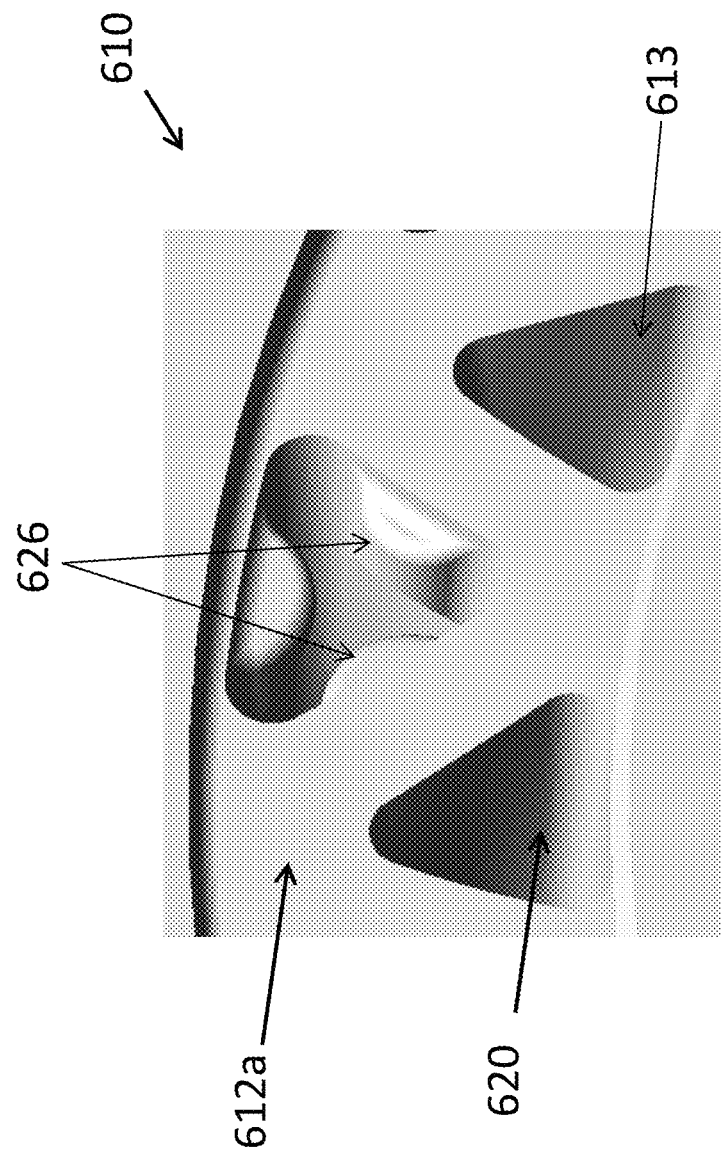

FIGS. 6a and 6b show different views of a tyre provided on the cavity sidewalls 614 with structural elements 626 having a convex shape. The structural elements may be positioned at any location in the cavity 613 e.g. they may be positioned near the cavity opening 620.

Figure 7A:
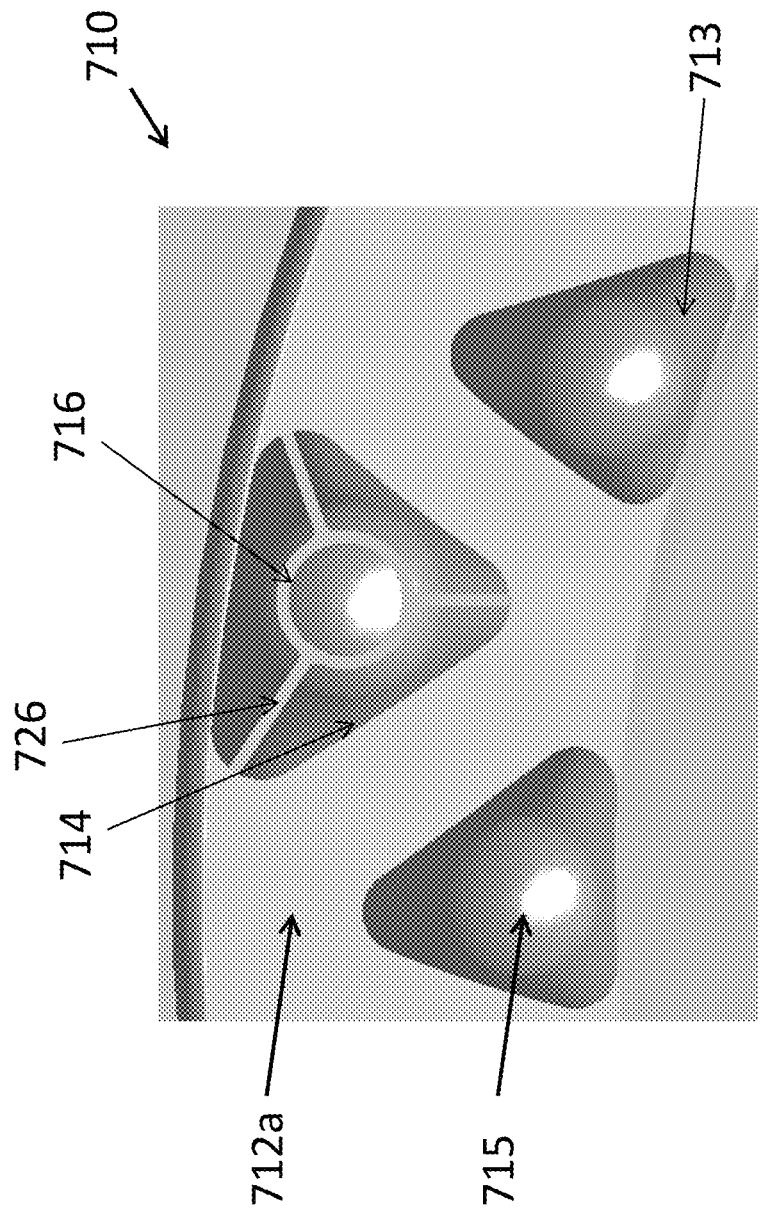
Figure 7B:
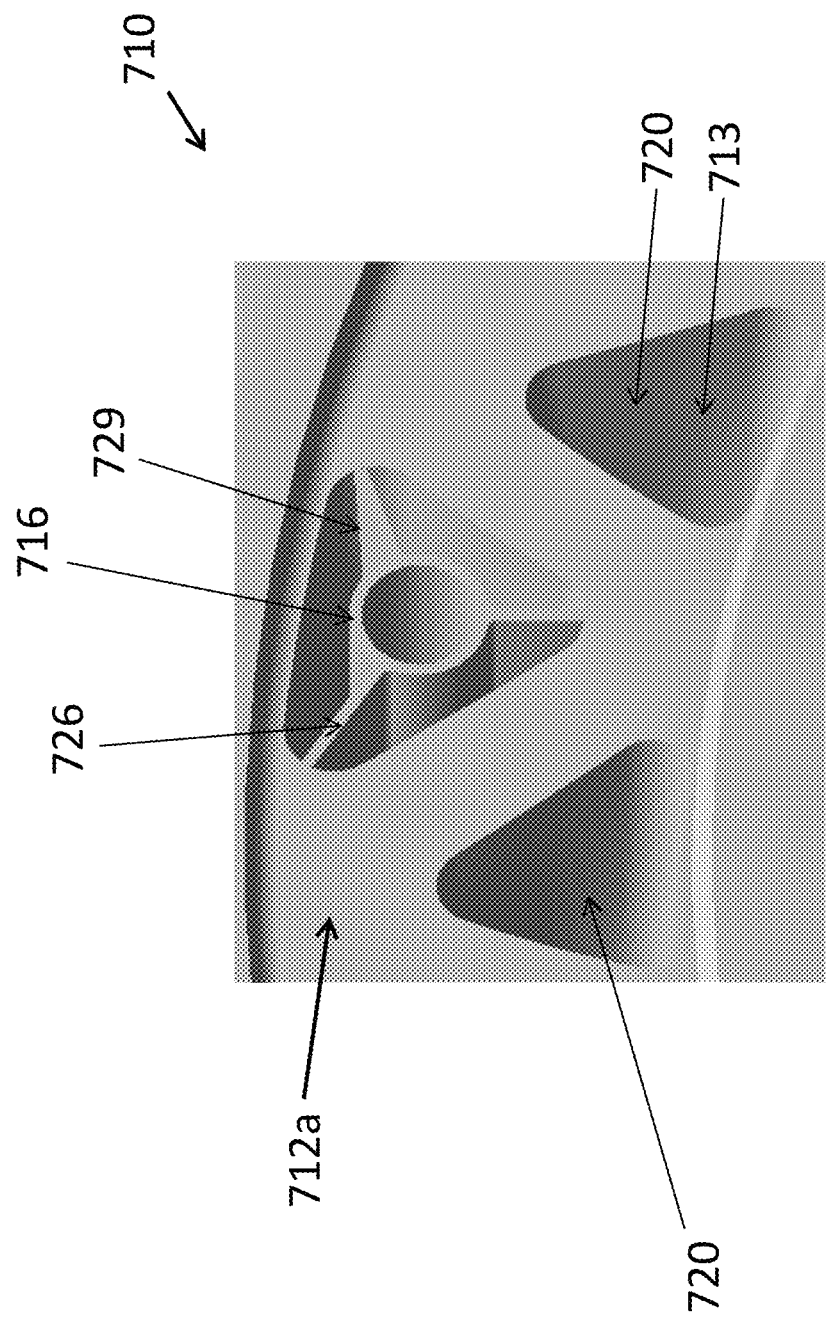
Figure 8:
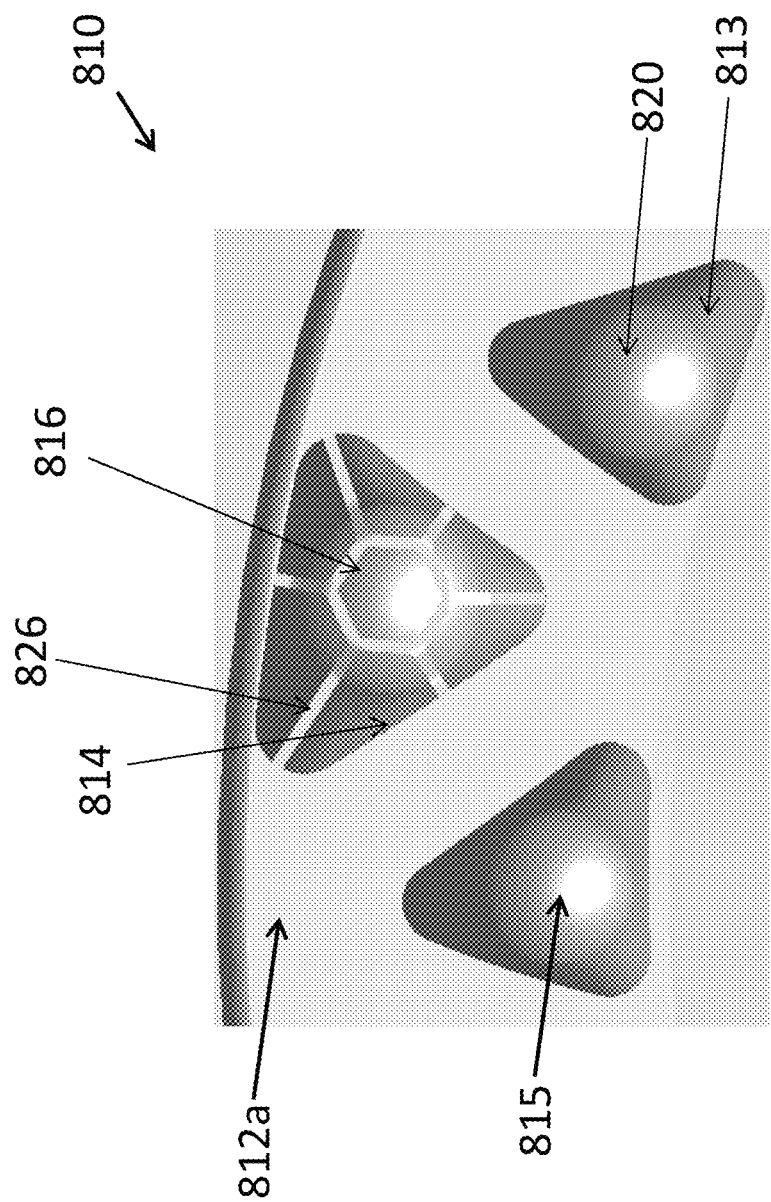
Figure 9:
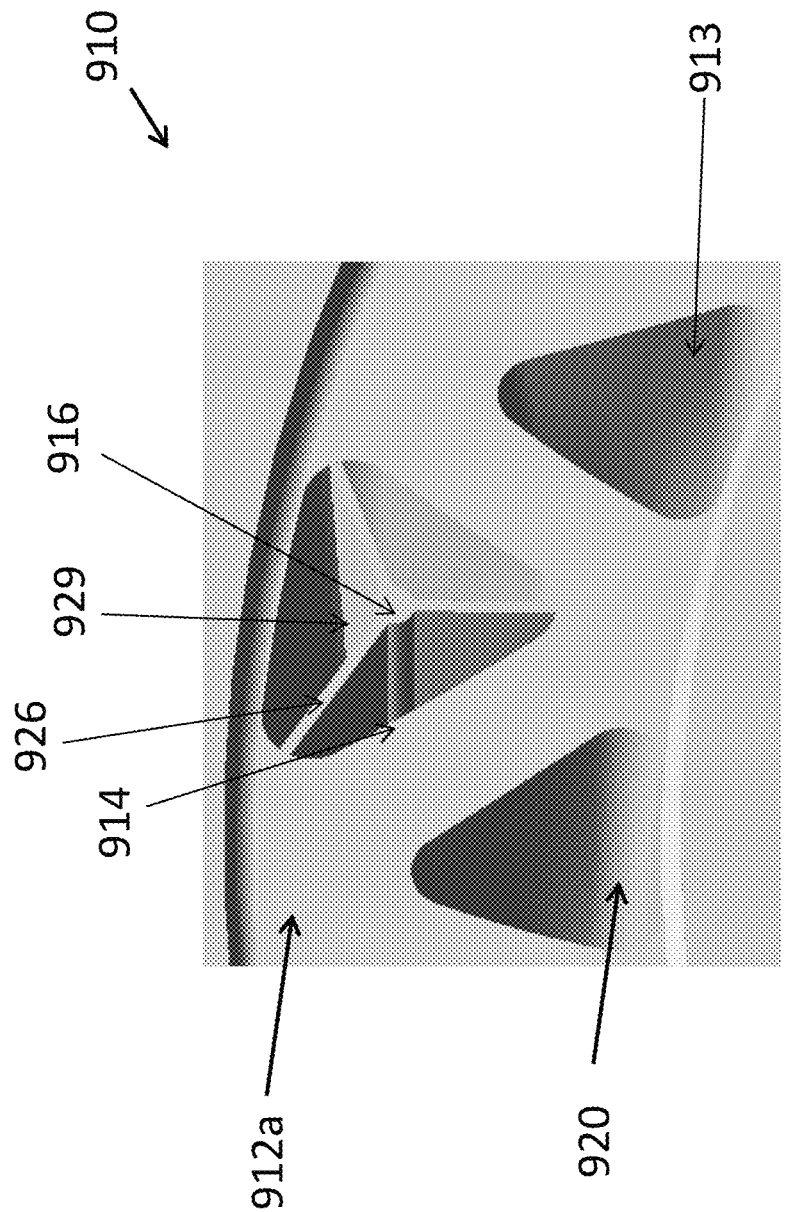
Figure 10:
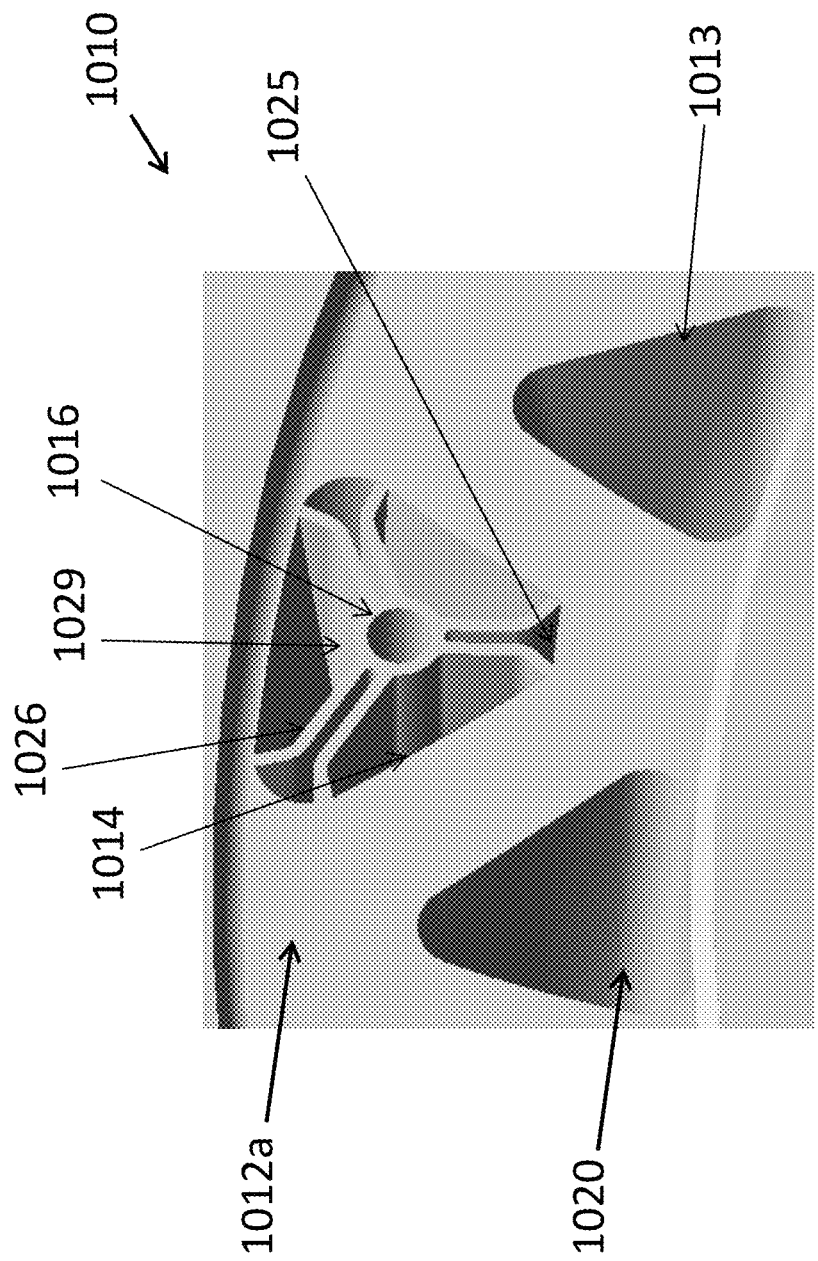

FIGS. 7a to 7b show different views of a tyre according to the present invention having at least one cavity 713, which is provided with a structural element 716 having a central body extending from the bottom surface 715 to the cavity opening 720 and a number of further structural elements 726 extending from the cavity sidewall surfaces 714 and connected to the central body of the structural element 716. The structural elements 726 may have a continuous surface 729 extending longitudinally from the cavity opening 720 towards the cavity bottom surface 715. The structural element 716 may be hollow, thereby provided with an opening at the apex so as to allow the jet stream of cleaning liquid to enter in the cavity 713. In another example, the structural element 916 may be solid, as shown in FIG. 9. The structural element 716, 916, 816 may be of any shape, such as cylindrical, as shown in FIG. 7a, 7b or 9, or hexagonal, as shown in FIG. 8. Furthermore, the structural elements 1026 protruding from the cavity sidewalls 1014 may also be provided with openings 1025, as shown in FIG. 10.

According to embodiments of the present invention, the cavity 113 may have any desirable shape such as triangular, circular, square, etc.

Furthermore, the tyre may be mounted on a vehicle that is used in heavy duty off-road working conditions.

The embodiments presented above are compatible with one another and may be combined by the skilled person in the art in any possible way to provide a tyre that can be used in a vehicle operating in heavy duty off-road conditions.

According to embodiments of the present invention, the present invention further relates to a method for cleaning a tyre 110, such as a non-pneumatic tyre, according to embodiments of the present invention. In order to remove the debris lodged in the tyre cavities 113, a cleaning device may be provided which can be operated between an off and an on position. The cleaning device may be arranged, when positioned in the on position, for directing a jet stream of highly pressurised cleaning liquid at a predetermined direction. For example, the cleaning device may comprise a nozzle arrange for compressing the cleaning liquid, which nozzle may be connected to a hose. The cleaning device may be connected to a source of high pressure cleaning liquid. The source of highly pressurised cleaning liquid may comprise a motor arranged for pressurising the cleaning liquid to the desired pressure level. In order to effectively clean the non-pneumatic tyre 110 and ensure that debris has been removed from the tyre cavities 113, it may be desirable to position the cleaning device at a close proximity to the tyre 110, such that the highly pressurised cleaning liquid is directed at a higher precision to the tyre cavities 113. The positioning of the cleaning device may be performed by a human operator. Once the cleaning device has been positioned at a desired proximity to the tyre 110, the human operator may operate the cleaning device in the on position such that the high pressure liquid is directed from the source of high pressure liquid to the cavity 113 in the tyre sidewall 112a and 112b. It may be desired to maintain the cleaning device in the on position for a predetermined amount of time so as to ensure that the debris has been removed from the cavity's unpressurised space. Preferably, during the cleaning operation the human operator maintains the close proximity to the tyre. The human operator repeats the cleaning operation for each of the cavities 113 provided in the tyre sidewalls 112a and 112b. The cleaning operation may be completed by operating the cleaning device in the off position.

The invention claimed is:

1. A tire comprising:
    an annular body of elastomeric material having a radial middle portion extending between a first tire sidewall and a second tire sidewall; and
    a plurality of cavities formed on each of the first and second tire sidewalls extending axially from a cavity opening up to a predetermined distance in the radial middle portion, wherein each cavity comprises an axially inner surface, referred to as the bottom surface, and at least one cavity sidewall surface extending from the bottom surface to the cavity opening, said bottom surface and at least one sidewall surface defining an unpressurised cavity space;
    wherein at least one of the cavities comprises a plurality of structural elements extending outwardly from the at least one cavity sidewall surface at a predetermined angle with respect to one another and with respect to the respective cavity surface; and
    wherein each structural element is a protrusion protruding away from the cavity surface which surrounds the protrusion into the unpressurised cavity space such that the structural element hinders debris, such as stones or scrap metal, from entering the cavity.

2. The tire according to claim 1, wherein at least one structural element of the plurality of structural elements has a predetermined geometrical shape, which is configured, when coming in contact with a jet stream of high pressure liquid, for breaking the jet stream of the liquid so as to reduce the velocity of the liquid exiting the cavity opening.

3. The tire according to claim 1, wherein at least one structural element of the plurality of structural elements comprises an elongated body extending from a cavity surface to a predetermined distance in the cavity unpressurised space.

4. The tire according to claim 3, wherein at least one structural element of the plurality of structural elements is dimensioned such that a gap is maintained at least between a surface of the structural element and/or an opposing cavity surface, and/or a surface of an adjacent structural element of the plurality of structural elements.

5. The tire according to claim 4, wherein the at least one structural element of the plurality of structural elements is dimensioned such that the gap is maintained under working conditions.

6. The tire according to claim 4, wherein the gap is progressively reduced towards the bottom cavity surface.

7. The tire according to claim 4, wherein the gap is between 1.0 mm and 10.0 cm.

8. The tire according to claim 3, wherein the elongated body of the at least one structural element of the plurality of structural elements has a length, which measured from the cavity surface to the structural element apex, between 5.0 mm and 50.0 cm.

9. The tire according to claim 1, wherein at least some of the plurality of structural elements have a conical geometrical shape.

10. The tire according to claim 9, wherein the diameter of the base of the conical shaped structural elements is between 5.0 mm and 10.0 mm.

11. The tire according to claim 1, wherein the cavity has a tapering cross-section towards the bottom surface.

12. The tire according to claim 1, wherein the cavity has a triangular shape.

13. The tire according to claim 1, wherein the cavity sidewall surfaces comprise at least one radial shoulder.

14. The tire according to claim 1, wherein at least one structural element of the plurality of structural elements is made of a different material than that of the tire annular body.

15. The tire according to claim 1, wherein at least one structural element of the plurality of structural elements is made of an elastomeric material substantially identical to that of the tire annular body.

16. The tire according to claim 15, wherein the at least one structural element of the plurality of structural elements that is made of an elastomeric material substantially identical to that of the tire annular body is integrally formed as one piece with the tire annular body.

17. A vehicle comprising a tire according to claim 1.

18. The tire according to claim 1, further comprising a second structural element different from the plurality of structural elements, wherein the second structural element is provided on the bottom surface and extends substantially towards the cavity opening.

* * * * *